US010399122B2

(12) United States Patent
Akanuma et al.

(10) Patent No.: US 10,399,122 B2
(45) Date of Patent: Sep. 3, 2019

(54) VIBRATION MOTOR

(71) Applicant: Nidec Seimitsu Corporation, Ueda-shi, Nagano-ken (JP)

(72) Inventors: Tomohiro Akanuma, Ueda (JP); Mitsuru Ol, Ueda (JP); Satoshi Nakazawa, Ueda (JP)

(73) Assignee: NIDEC SEIMITSU CORPORATION, Nagano (JP)

(*) Notice: Subject to any disclaimer, the term of this patent is extended or adjusted under 35 U.S.C. 154(b) by 221 days.

(21) Appl. No.: 15/662,321

(22) Filed: Jul. 28, 2017

(65) Prior Publication Data

US 2018/0056329 A1 Mar. 1, 2018

(30) Foreign Application Priority Data

Aug. 29, 2016 (JP) ................................ 2016-166858

(51) Int. Cl.
*H02K 33/16* (2006.01)
*B06B 1/04* (2006.01)

(52) U.S. Cl.
CPC ............... *B06B 1/04* (2013.01); *H02K 33/16* (2013.01)

(58) Field of Classification Search
CPC ...... H02K 33/16; H02K 41/03; H02K 41/035; B06B 33/16
USPC ........................................................ 310/15
See application file for complete search history.

(56) References Cited

U.S. PATENT DOCUMENTS

| | | | | | |
|---|---|---|---|---|---|
| 5,434,549 | A * | 7/1995 | Hirabayashi | H02K 33/00 | 335/229 |
| 6,313,551 | B1 * | 11/2001 | Hazelton | H02K 41/03 | 310/12.24 |
| 7,474,018 | B2 * | 1/2009 | Shimizu | A61C 17/3445 | 310/12.22 |
| 7,884,509 | B2 * | 2/2011 | Mukaide | H02K 41/03 | 310/12.19 |
| 9,467,035 | B2 * | 10/2016 | Endo | B06B 1/045 | |
| 2013/0169071 | A1 * | 7/2013 | Endo | H02K 33/02 | 310/25 |
| 2014/0346901 | A1 * | 11/2014 | Hayward | H02K 33/16 | 310/25 |

FOREIGN PATENT DOCUMENTS

JP 5872108 B2 3/2016

* cited by examiner

*Primary Examiner* — Burton S Mullins
(74) *Attorney, Agent, or Firm* — Keating & Bennett, LLP

(57) ABSTRACT

A vibration motor includes a shaft, a stationary portion, a vibrating body, and an elastic member. The vibrating body includes a weight, first magnets, magnetic bodies, and one or more second magnets. Each first magnet has a ring shape and is magnetized in an inner or outer circumferential direction. Each magnetic body has a ring shape and is disposed between the shaft and a corresponding one of the first magnets. The one or more second magnets are magnetized in one direction, have a ring shape, and are interposed between the magnetic bodies corresponding thereto that are adjacent to each other in the one direction. The adjacent first magnets in the one direction are such that magnetic polarities of one of the first magnets at inner and outer circumferences thereof are opposite to magnetic polarities of another of the first magnets adjacent thereto at inner and outer circumferences thereof.

15 Claims, 6 Drawing Sheets

VIBRATION MOTOR

CROSS REFERENCE TO RELATED APPLICATIONS

This application claims the benefit of priority to Japanese Patent Application No. 2016-166858 filed on Aug. 29, 2016. The entire contents of this application are hereby incorporated herein by reference.

1. FIELD OF THE INVENTION

The present invention relates to a vibration motor.

2. DESCRIPTION OF THE RELATED ART

Hitherto, vibration motors have been used in various devices, such as smartphones. In recent years, haptic technology, which is a technology for transmitting information through tactile sensation, has been improved. Therefore, vibration motors are required not only to have an existing vibration function for silent notification, but also a function of allowing small vibrations to be transmitted for, for example, tactile feedback. There is a demand for high responsivity in, for example, tactile feedback.

Japanese Patent No. 5872108 discloses an existing linear motor like the following. This linear motor includes a stator and a rotor. The stator includes a casing, a coil, a yoke, and linear bushes. The rotor includes a shaft, a plurality of thrust magnets, a plurality of radial magnets, and retaining rings.

The shaft, the coil, and the yoke are accommodated in the casing. Inside the casing, the coil is provided so as to surround the shaft. Inside the casing, the yoke is provided on an outer side of the coil. The linear bushes that movably hold the shaft are disposed, one at each of two ends of the casing.

The shaft has two grooves that extend in a circumferential direction. The retaining rings are fitted to the corresponding grooves. The thrust magnets and the radial magnets have a cylindrical shape. The plurality of thrust magnets and the plurality of radial magnets are interposed between the two retaining rings, and are mounted on the shaft.

Magnetic flux that is set up around each thrust magnet is in a direction that is parallel to a direction of extension of the shaft. Magnetic flux that is set up around each radial magnet is in a direction that corresponds to a radial direction of the shaft. The thrust magnets and the radial magnets are alternately disposed side by side. That is, the thrust magnets and the radial magnets are mounted on the shaft in a so-called Halbach array.

By virtue of such a structure, it is possible to move the rotor in the direction of extension of the shaft by controlling electric current that flows through the coil.

If the structure of the linear motor described above is applied to vibration motors, the Halbach array of magnets makes it possible to concentrate the magnetic flux at a coil side and to improve the responsivity of vibration motors.

In particular, size reduction of vibration motors is required, and size reduction of magnets that are built in the vibration motors is also required. Even if the aforementioned thrust magnets that are to be magnetized in a central axis direction are reduced in size, the thrust magnets can be easily magnetized. However, if the aforementioned radial magnets that are to be magnetized in an inner circumferential direction or an outer circumferential direction are reduced in size, it is difficult to produce magnetizing yokes for magnetizing the radial magnets. In addition, it becomes difficult to sufficiently magnetize the radial magnets. Therefore, in the related art, the size reduction of vibration motors is hindered.

SUMMARY OF THE INVENTION

An exemplary embodiment of the present application provides a vibration motor including a shaft that extends in one direction, a stationary portion that includes a casing and a coil, a vibrating body that is disposed on an outer side of the shaft in a radial direction and that is capable of vibrating in the one direction with respect to the stationary portion, and an elastic member that is disposed between the stationary portion and the vibrating body. The coil is disposed so as to surround the shaft. The vibrating body includes a weight, a plurality of first magnets, a plurality of magnetic bodies, and one or more second magnets. Each of the plurality of first magnets has a ring shape formed around the shaft and is magnetized in an inner circumferential direction or an outer circumferential direction. Each of the plurality of magnetic bodies has a ring shape formed around the shaft and is disposed between the shaft and a corresponding one of the first magnets. The one or more second magnets are magnetized in the one direction, have a ring shape formed around the shaft, and are interposed between the magnetic bodies corresponding thereto that are adjacent to each other in the one direction. The first magnets that are adjacent to each other in the one direction are such that magnetic polarities of one of the first magnets at inner and outer circumferences thereof are opposite to magnetic polarities of another of the first magnets adjacent thereto at inner and outer circumferences thereof.

In the exemplary embodiment of the present application, the vibration motor can be reduced in size and can exhibit high responsivity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Exemplary embodiments of the present invention are described below with reference to the drawings.

First Embodiment

Figure 1:
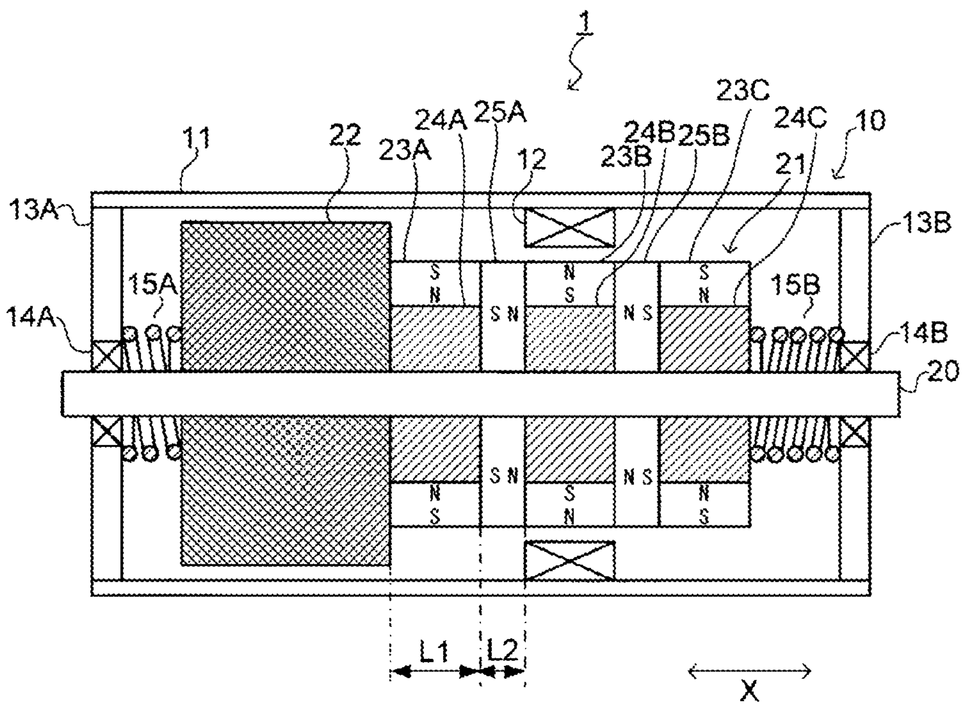
FIG. 1 is a schematic side sectional view of a vibration motor according to a first embodiment of the present invention.

FIG. 1 is a schematic side sectional view of a vibration motor 1 according to a first embodiment of the present invention. In FIG. 1, one direction in which a shaft 20 of the vibration motor 1 extends is denoted as an X direction.

The vibration motor 1 according to the first embodiment shown in FIG. 1 includes a stationary portion 10, elastic members 15A and 15B, the shaft 20, and a vibrating body 21. In the embodiment, the shaft 20 and the vibrating body 21 constitute a movable portion.

The stationary portion 10 includes a case 11, a coil 12, covers 13A and 13B, and bearings 14A and 14B. The case 11 has a cylindrical shape extending in the one direction. A section of the case 11 that is seen in the one direction may have the shape of a circular ring or the shape of a rectangular ring.

The cover 13A is disposed at a location where the cover 13A covers one of the end portions of the case 11. The cover 13B is disposed at a location where the cover 13B covers the other end portion of the case 11. The bearing 14A is fitted to a hole portion in the center of the cover 13A. The bearing 14B is fitted to a hole portion in the center of the cover 13B. The case 11 corresponds to a casing. That is, the stationary portion 10 includes the casing and the coil 12.

The vibrating body 21 includes a weight 22, first magnets 23A to 23C, magnetic bodies 24A to 24C, and second magnets 25A and 25B.

Both ends of the shaft 20 are supported, one of the ends by the bearing 14A and the other end by the bearing 14B, so as to be movable in the one direction. The shaft 20 may be made of a magnetic material or a nonmagnetic material, such as resin. The weight 22 has a cylindrical shape, and is made of, for example, a tungsten alloy. The shaft 20 is inserted and fixed in the weight 22. The weight 22 is fixed to the shaft 20 with, for example, an adhesive.

The first magnets 23A to 23C are disposed in the one direction. Each of the first magnets 23A to 23C has a ring shape formed around the shaft 20, and is magnetized in an inner circumferential direction or an outer circumferential direction. Each of the magnetic bodies 24A to 24C (magnetic body blocks) has a ring shape formed around the shaft 20. The magnetic bodies 24A to 24C are each disposed between the shaft 20 and a corresponding one of the first magnets 23A to 23C. The magnetic bodies 24A to 24C are made of ferromagnetic materials. The first magnets 23A to 23C and the corresponding magnetic bodies 24A to 24C are fixed to each other by, for example, bonding them to each other with an adhesive. The magnetic bodies 24A to 24C are fixed to the shaft 20 by, for example, bonding them to each other with an adhesive. The first magnet 23A and the magnetic body 24A contact a surface of the weight 22, and are disposed adjacent to the weight 22 in the one direction.

The second magnets 25A and 25B are magnetized in the one direction, and have a ring shape formed around the shaft 20. The second magnet 25A is interposed between the magnetic bodies 24A and 24B that are adjacent to each other in the one direction. The second magnet 25B is interposed between the magnetic bodies 24B and 24C that are adjacent to each other in the one direction.

Each of the second magnets 25A and 25B is fitted and fixed to the shaft 20. That is, other members, such as magnetic bodies, do not exist between the second magnet 25A and the shaft 20 and between the second magnet 25B and the shaft 20. This makes it possible to reduce the number of parts. The second magnets 25A and 25B are fixed to the shaft 20 by, for example, bonding them to each other with an adhesive.

By virtue of the structure of the vibrating body 21 such as that described above, the vibrating body 21 is disposed on an outer side of the shaft 20 in a radial direction. The elastic member 15A, which is a coil spring, is disposed between the cover 13A and the weight 22. The elastic member 15B, which is a coil spring, is disposed between the cover 13B and the magnetic body 24C. That is, the elastic members 15A and 15B are disposed between the stationary portion 10 and the vibrating body 21.

Here, the first magnets 23A and 23B that are adjacent to each other in the one direction are such that the magnetic polarities of the first magnet 23A at inner and outer circumferences thereof are opposite to the magnetic polarities of the first magnet 23B at inner and outer circumferences thereof. Similarly, the first magnets 23B and 23C that are adjacent to each other in the one direction are such that the magnetic polarities of the first magnet 23B at the inner and outer circumferences thereof are opposite to the magnetic polarities of the first magnet 23C at inner and outer circumferences thereof. The second magnets 25A and 25B that are adjacent to each other in the one direction are such that the direction of magnetic flux at the second magnet 25A with respect to the one direction and the direction of magnetic flux at the second magnet 25B with respect to the one direction are opposite to each other. The coil 12 is wound around the shaft 20, and is fixed to an inner wall surface of the case 11. That is, the coil 12 is disposed so as to surround the shaft 20. The first magnet 23B is disposed inwardly of the coil 12 in a radial direction. The lengths of the first magnets 23A to 23C in the one direction are the same. The length of the first magnet 23B and the length of the coil 12 in the one direction are the same.

Therefore, the first magnets 23A to 23C, the magnetic bodies 24A to 24C, and the second magnets 25A and 25B form a so-called Halbach array structure. By magnetizing the magnetic bodies 24A to 24C, a magnetic path including the second magnets 25A and 25B is formed in the one direction, and magnetic flux concentrates at a coil-12 side. By controlling electric current that flows through the coil 12, magnetic flux that is set up around each of the first magnets 23A to 23C, and magnetic flux that is set up around the coil 12 interact with each other to make it possible to vibrate the vibrating body 21 and the shaft 20 as a movable portion with respect to the stationary portion 10 in the one direction.

In reducing the size of the vibration motor 1, even if the first magnets 23A to 23C are reduced in size, since the magnetic bodies 24A to 24C are disposed on inner circumferential sides of the corresponding first magnets 23A to 23C, the inside diameters of the first magnets 23A to 23C can be made large. Therefore, regarding the first magnets 23A to 23C, which are magnets that are magnetized in the inner circumferential direction or the outer circumferential direction, it is possible to produce magnetizing yokes and sufficiently magnetize the first magnets 23A to 23C. Consequently, it is possible to reduce the size of the vibration motor 1.

Further, by forming the Halbach array structure by the first magnets 23A to 23C, the magnetic bodies 24A to 24C, and the second magnets 25A and 25B as described above, it is possible to increase magnetic force at the coil-12 side, and to realize high responsiveness of the vibration motor 1. That is, the vibration motor 1 according to this embodiment can be reduced in size and can exhibit high responsivity.

A length L2 of each of the second magnets 25A and 25B in the one direction is less than or equal to a length L1 of each of the first magnets 23A to 23C in the one direction. The length of each of the second magnets 25A and 25B, which is provided for ensuring the formation of the magnetic path in the one direction, in the one direction only needs to be less than or equal to the length of each of the first magnets 23A to 23C, which directly contributes to a driving operation, in the one direction. Therefore, the size of the vibration motor 1 in the one direction can be reduced.

In producing the vibration motor 1, when the movable portion is to be assembled from the shaft 20 and the vibrating body 21, for example, with the weight 22 fixed to the shaft 20 first, a pair of the first magnet 23A and the magnetic body 24A, the second magnet 25A, a pair of the first magnet 23B and the magnetic body 24B, the second magnet 25B, and a pair of the first magnet 23C and the magnetic body 24C are fixed to the shaft 20 in that order.

The outside diameter of each of the second magnets 25A and 25B is equal to the outside diameter of each of the first magnets 23A to 23C. That is, the second magnets 25A and 25B overlap the first magnets 23A to 23C in the one direction. Therefore, in the above-described step of assembling the movable portion, by bringing the first magnet 23B into contact with the second magnet 25A, the first magnet 23B can be positioned in the one direction; and by bringing the first magnet 23C into contact with the second magnet 25B, the first magnet 23C can be positioned in the one direction.

In the step of assembling the movable portion, even when the pair of the first magnet 23C and the magnetic body 24C is fixed to the shaft 20 first, effects similar to those based on the positioning of the first magnets are provided.

In order to provide the above-described positioning effects, it is possible to make the outside diameters of the second magnets smaller than the outside diameters of the first magnets, and to make the second magnets overlap the first magnets in the one direction.

Second Embodiment

Figure 2:
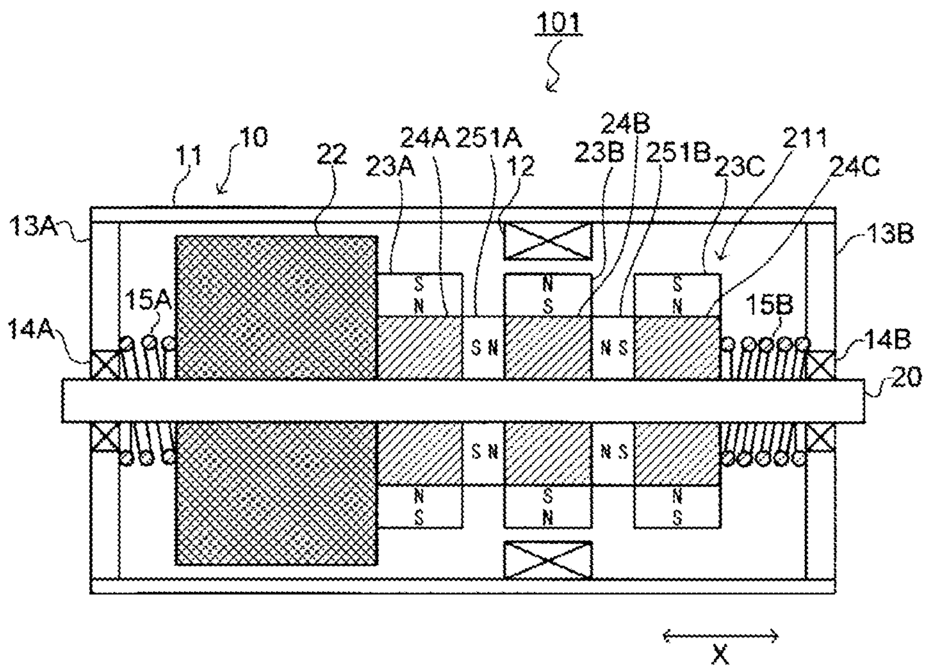
FIG. 2 is a schematic side sectional view of a vibration motor according to a second embodiment of the present invention.

Next, a second embodiment of the present invention is described. FIG. 2 is a schematic side sectional view of a vibration motor 101 according to the second embodiment of the present invention.

The structure of the vibration motor 101 shown in FIG. 2 differs from the structure of the vibration motor 1 according to the first embodiment in the structure of a vibrating body 211. In the vibrating body 211, the outside diameters of second magnets 251A and 251B are equal to the outside diameters of magnetic bodies 24A to 24C. Therefore, the positioning effects of the step of assembling the movable portion as those described in the first embodiment are not provided. However, compared to the first embodiment, it is possible to reduce the amounts of use of the second magnets and to reduce costs.

In addition, even in this embodiment, the vibration motor 101 can be reduced in size by disposing the magnetic bodies 24A to 24C on inner circumferential sides of corresponding first magnets 23A to 23C. Further, since the first magnets 23A to 23C, the magnetic bodies 24A to 24C, and the second magnets 251A and 251B form a Halbach array structure, the vibration motor 101 can exhibit high responsivity.

Third Embodiment

Figure 3:
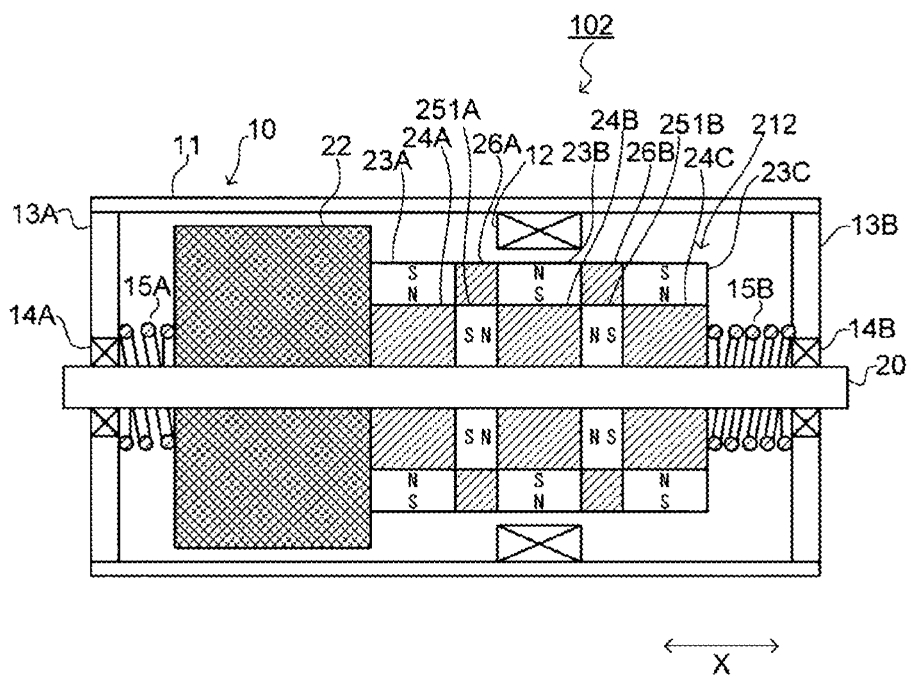
FIG. 3 is a schematic side sectional view of a vibration motor according to a third embodiment of the present invention.

Next, a third embodiment of the present invention is described. FIG. 3 is a schematic side sectional view of a vibration motor 102 according to the third embodiment of the present invention.

The structure of the vibration motor 102 shown in FIG. 3 differs from the structure of the vibration motor 101 according to the second embodiment in the structure of a vibrating body 212. Compared to the vibrating body 211 according to the second embodiment, the vibrating body 212 further includes ring-shaped magnetic bodies 26A and 26B.

Each of the ring-shaped magnetic bodies 26A and 26B (magnetic body blocks) extends around the shaft 20, and is made of a ferromagnetic material. The ring-shaped magnetic bodies 26A and 26B are disposed on outer circumferential sides of corresponding second magnets 251A and 251B. The outside diameter of each of the ring-shaped magnetic bodies 26A and 26B is equal to the outside diameter of each of the first magnets 23A to 23C. That is, the ring-shaped magnetic bodies 26A and 26B overlap the first magnets 23A to 23C in the one direction.

Similarly to the effects described in the first embodiment, it is possible to position the first magnets 23A to 23C in the one direction when assembling a movable portion by providing the ring-shaped magnetic bodies 26A and 26B.

As long as the ring-shaped magnetic bodies overlap the first magnets in the one direction, the outside diameters of the ring-shaped magnetic bodies can be smaller than the outside diameters of the first magnets.

Fourth Embodiment

Figure 4:
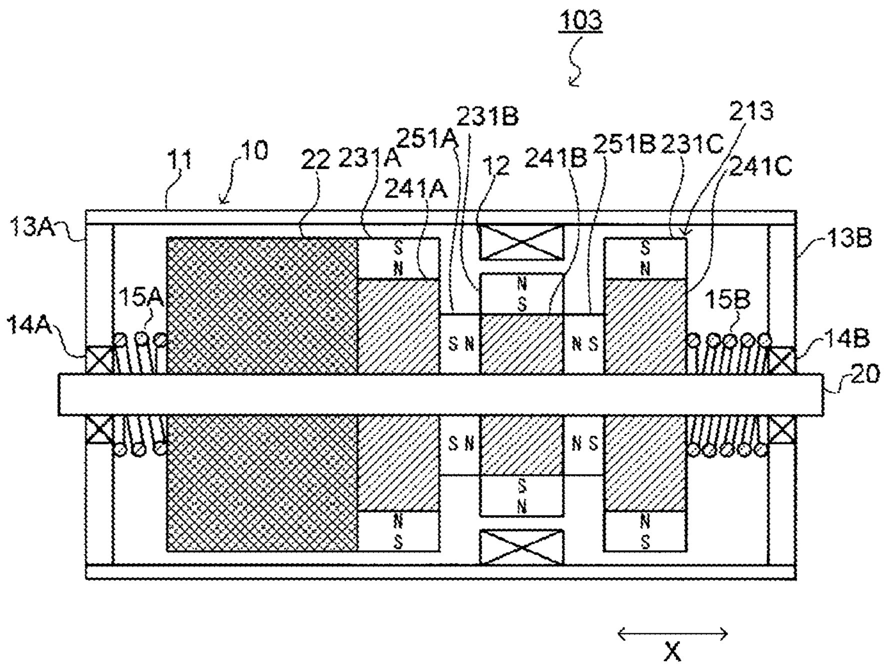
FIG. 4 is a schematic side sectional view of a vibration motor according to a fourth embodiment of the present invention.

Next, a fourth embodiment of the present invention is described. FIG. 4 is a schematic side sectional view of a vibration motor 103 according to the fourth embodiment of the present invention.

The structure of the vibration motor 103 shown in FIG. 4 differs from the structure of the vibration motor 101 according to the second embodiment in the structure of a vibrating body 213. The vibrating body 213 includes first magnets 231A to 231C and magnetic bodies 241A to 241C.

The first magnet 231A, which is one of the first magnets 231A and 231B that are adjacent to each other in the one direction, overlaps a coil 12 in the one direction. The first magnet 231B, which is the other of the first magnets 231A and 231B that are adjacent to each other in the one direction, is disposed inwardly of the coil 12 in a radial direction. Therefore, it is possible to reduce magnetic flux leakage at a location between the first magnets 231A and 231B. Regarding the first magnets 231B and 231C that are adjacent to each other in the one direction, a similar structure is used.

However, in this embodiment, in assembling the vibration motor 103, for example, even if, with an end of a case 11 covered by a cover 13B (and a bearing 14B), an attempt is made to mount a movable portion that has been previously assembled from a shaft 20 and the vibrating body 213 into the case 11 by inserting the movable portion into the case 11 from a side opposite to a cover-13B side of the case 11 after disposing an elastic member 15B, the first magnet 231C interferes with the coil 12. Therefore, the movable portion cannot be mounted in the case 11.

In this respect, in the first to third embodiments, since the first magnets, the second magnets, or the ring-shaped magnetic bodies do not overlap the coil 12 in the one direction, it is possible to mount the movable portion without interfering with the coil 12 even by performing the above-described method of assembling a vibration motor.

Fifth Embodiment

Figure 5:
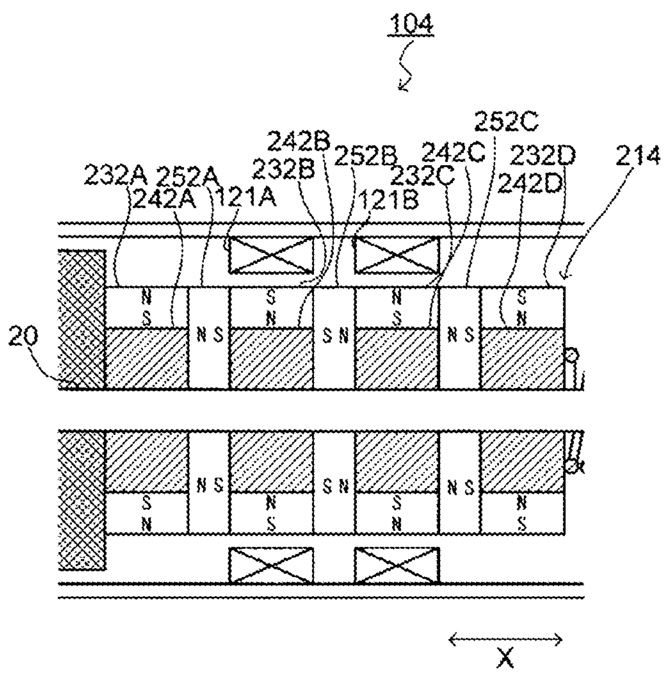
FIG. 5 is a schematic partial side sectional view of a vibration motor according to a fifth embodiment of the present invention.

Next, a fifth embodiment of the present invention is described. FIG. 5 is a schematic partial side sectional view of a vibration motor 104 according to the fifth embodiment of the present invention.

Compared to the vibrating body 21 of the vibration motor 1 (FIG. 1) according to the first embodiment, a vibrating body 214 of the vibration motor 104 shown in FIG. 5 has a larger number of first magnets. More specifically, the vibrating body 214 includes four first magnets 232A to 232D, magnetic bodies 242A to 242D, each being disposed between a shaft 20 and a corresponding one of the first magnets 232A to 232D, and second magnets 252A to 252C, each being interposed between a corresponding pair of magnetic bodies that are adjacent to each other in the one direction among the magnetic bodies 242A to 242D. Coils 121A and 121B are each disposed outwardly in a radial direction of a corresponding one of two inner first magnets 232B and 232C among the four first magnets.

In each pair of first magnets that are adjacent to each other in the one direction among the first magnets 232A to 232D, the magnetic polarities of one of the first magnets at inner and outer circumferences thereof are opposite to the magnetic polarities of the other first magnet at inner and outer circumferences thereof. Each pair of second magnets that are adjacent to each other in the one direction among the second magnets 252A to 252C is such that the direction of magnetic flux at one of the second magnets with respect to the one direction and the direction of magnetic flux at the other second magnet with respect to the one direction are opposite to each other. Therefore, even in this embodiment, a Halbach array structure is formed.

Sixth Embodiment

Figure 6:
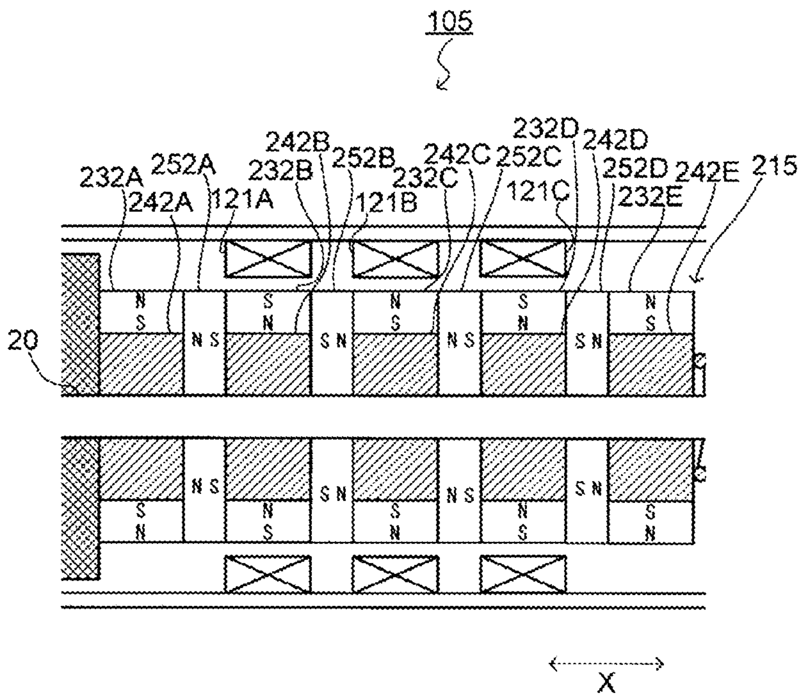
FIG. 6 is a schematic partial side sectional view of a vibration motor according to a sixth embodiment of the present invention.

Next, a sixth embodiment of the present invention is described. FIG. 6 is a schematic partial side sectional view of a vibration motor 105 according to the sixth embodiment of the present invention.

Compared to the structure of the vibrating body 214 of the vibration motor 104 (FIG. 5) according to the fifth embodiment, the structure of a vibrating body 215 of the vibration motor 105 shown in FIG. 6 has a still larger number of first magnets. More specifically, the vibrating body 215 includes five first magnets 232A to 232E, magnetic bodies 242A to 242E, each being disposed between a shaft 20 and a corresponding one of the first magnets 232A to 232E, and second magnets 252A to 252D, each being interposed between a corresponding pair of magnetic bodies that are adjacent to each other in the one direction among the magnetic bodies 242A to 242E. In addition, coils 121A to 121C are each disposed outwardly in a radial direction of a corresponding one of three inner first magnets 232B to 232D among the five first magnets.

In each pair of first magnets that are adjacent to each other in the one direction among the first magnets 232A to 232E, the magnetic polarities of one of the first magnets at inner and outer circumferences thereof are opposite to the magnetic polarities of the other first magnet at inner and outer circumferences thereof. Each pair of second magnets that are adjacent to each other in the one direction among the second magnets 252A to 252D is such that the direction of magnetic flux at one of the second magnets with respect to the one direction and the direction of magnetic flux at the other second magnet with respect to the one direction are opposite to each other. Therefore, even in this embodiment, a Halbach array structure is formed.

Regarding Relationships Between Number of Members

In the first to fourth embodiments, there are two second magnets for three first magnets. In the fifth embodiment, there are three second magnets for four first magnets. In the sixth embodiment, there are four second magnets for five first magnets. That is, the number of second magnets is one less than the number of first magnets.

In the first, second, and fourth embodiments, there are three magnetic bodies for three first magnets. In the fifth embodiment, there are four magnetic bodies for four first magnets. In the sixth embodiment, there are five magnetic bodies for five first magnets. In the third embodiment, there are three magnetic bodies and two ring-shaped magnetic bodies for three first magnets and two second magnets. That is, the number of magnetic body blocks including the magnetic bodies is equal to the number of first magnets or to the sum of the number of first magnets and the number of second magnets.

Others

Although embodiments according to the present invention are described, the embodiments can be variously modified as long as they are modified within the scope of the gist of the present invention.

For example, when a Halbach array structure is formed as in the above-described embodiments, magnetic flux perpendicularly entering the coil may be reduced due to the rotation of the magnetic flux. Therefore, the length of each first magnet in the one direction may be greater than the length of the coil in the one direction.

When the case in which the coil is disposed is made of a magnetic material, magnetic flux perpendicularly enters the coil easily. Therefore, this is desirable. That is, it is desirable that the casing be made of a magnetic material.

Although, in each of the above-described embodiments, the shaft is included in the movable portion, the shaft may be fixed to the casing and the vibrating body may be made movable in the one direction with respect to the shaft.

Although two elastic members are disposed, one at each end of the vibrating body in the one direction, only one elastic member may be disposed at one end of the vibrating body in the one direction.

Although, in each of the above-described embodiments, one shaft extends through the vibrating body, two shafts may be used with one of the shafts being inserted partway into the weight from an end portion of the vibrating body on a side thereof where the magnets are disposed and the other shaft being inserted partway into the weight from an end portion of the vibrating body on a side thereof where the weight is disposed. In this case, for example, one of the shafts is held by one of the bearings, and the other shaft is held by the other bearing.

The present invention is applicable to, for example, a vibration motor that is installed in, for example, a smartphone or a gamepad.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor comprising:

a shaft that extends in one direction;

a stationary portion that includes a casing and a coil;

a vibrating body that is disposed on an outer side of the shaft in a radial direction and that is capable of vibrating in the one direction with respect to the stationary portion; and an elastic member that is disposed between the stationary portion and the vibrating body, wherein the coil is disposed so as to surround the shaft, wherein the vibrating body includes a weight, a plurality of first magnets, a plurality of magnetic bodies, and one or more second magnets, the plurality of first magnets each having a ring shape formed around the shaft and being magnetized in an inner circumferential direction or an outer circumferential direction, the plurality of magnetic bodies each having a ring shape formed around the shaft and each being disposed between the shaft and a corresponding one of the first magnets, the one or more second magnets each being magnetized in the one direction, having a ring shape formed around the shaft, and being interposed between the magnetic bodies corresponding thereto that are adjacent to each other in the one direction, and wherein the first magnets that are adjacent to each other in the one direction are such that magnetic polarities of one of the first magnets at inner and outer circumferences thereof are opposite to magnetic polarities of another of the first magnets adjacent thereto at inner and outer circumferences thereof.

2. The vibration motor according to claim 1, wherein a length of the one second magnet or each second magnet in the one direction is less than or equal to a length of each first magnet in the one direction.

3. The vibration motor according to claim 2, wherein the one or more second magnets are fitted to the shaft.

4. The vibration motor according to claim 3, wherein the one or more second magnets overlap the first magnets in the one direction.

5. The vibration motor according to claim 4, wherein a length of each first magnet in the one direction is greater than a length of the coil in the one direction.

6. The vibration motor according to claim 5, wherein the casing is made of a magnetic material.

7. The vibration motor according to claim 6, wherein the number of second magnets is one less than the number of first magnets, and the number of magnetic body blocks including the magnetic bodies is equal to the number of first magnets or to a sum of the number of first magnets and the number of second magnets.

8. The vibration motor according to claim 3, wherein the vibrating body further includes a ring-shaped magnetic body which extends around the shaft, which is disposed on an outer circumferential side of the one or more second magnets corresponding thereto, and which overlaps the first magnets in the one direction.

9. The vibration motor according to claim 8, wherein a length of each first magnet in the one direction is greater than a length of the coil in the one direction.

10. The vibration motor according to claim 9, wherein the casing is made of a magnetic material.

11. The vibration motor according to claim 10, wherein the number of second magnets is one less than the number of first magnets, and the number of magnetic body blocks including the magnetic bodies is equal to the number of first magnets or to a sum of the number of first magnets and the number of second magnets.

12. The vibration motor according to claim 3, wherein one of the first magnets that are adjacent to each other in the one direction overlaps the coil in the one direction, and the other of the first magnets that are adjacent to each other in the one direction is disposed inwardly of the coil in the radial direction.

13. The vibration motor according to claim 12, wherein a length of each first magnet in the one direction is greater than a length of the coil in the one direction.

14. The vibration motor according to claim 13, wherein the casing is made of a magnetic material.

15. The vibration motor according to claim 14, wherein the number of second magnets is one less than the number of first magnets, and the number of magnetic body blocks including the magnetic bodies is equal to the number of first magnets or to a sum of the number of first magnets and the number of second magnets.

* * * * *